United States Patent

[11] 3,586,398

| [72] | Inventors | Floyd S. Dadds,<br>Peoria;<br>David V. Nelson, East Peoria, both of, Ill. |
|---|---|---|
| [21] | Appl. No. | 844,843 |
| [22] | Filed | July 25, 1969 |
| [45] | Patented | June 22, 1971 |
| [73] | Assignee | Caterpillar Tractor Co.<br>Peoria, Ill. |

[54] TRACK ROLLER FOR TRACK-TYPE TRACTOR
4 Claims, 1 Drawing Fig.

| [52] | U.S. Cl. | 308/18 |
|---|---|---|
| [51] | Int. Cl. | F16c 13/00 |
| [50] | Field of Search | 308/18;<br>74/230.23; 74/230.24 |

[56] References Cited
UNITED STATES PATENTS

| 3,147,048 | 9/1964 | Johnson et al. | 308/18 |
| 3,154,958 | 10/1964 | Cadwell et al. | 74/230.3 |

*Primary Examiner*—Fred C. MATTERN, Jr.
*Assistant Examiner*—Randall Heald
*Attorney*—Fryer, Tjensvold, Feix, Phillips & Lempio ABSTRACT: A track roller assembly including a roller hub supporting externally fitted rims and internally fitted bearing sleeves which rotate on a dead shaft. An unusually loose fit is provided between the rims and hub so that the hub is not compressed in assembly and then allowed to expand and cause deterioration of the bearings when the hub becomes enlarged from use. A tight fit between the rims and hub is provided inwardly of the rims in a narrow area which is limited by spaced shoulders which locate the rims and the hub. The shoulders are spaced to limit the areas of tight fit and also to locate them in safe areas where they will not be damaged in disassembly of the roller.

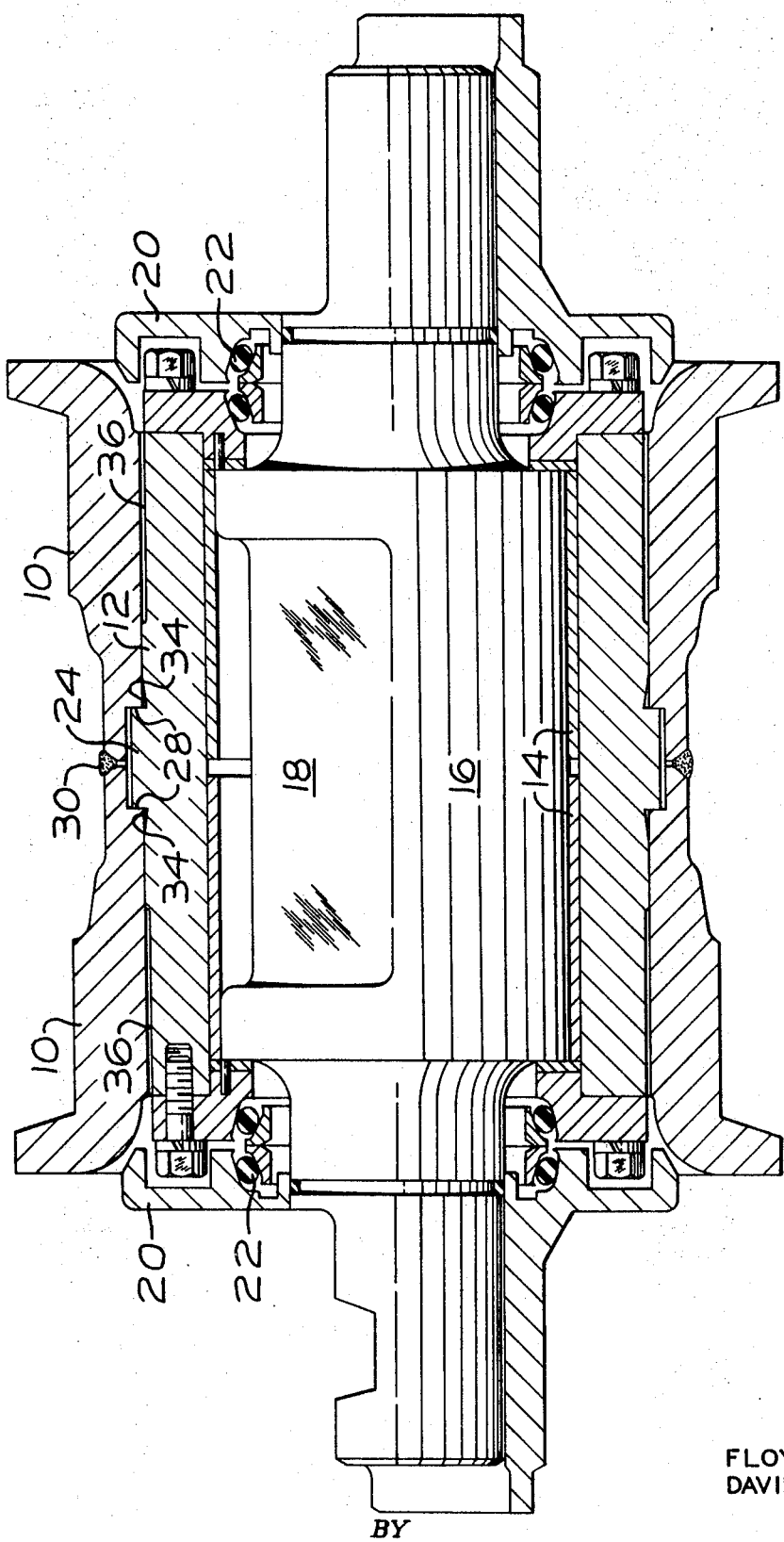

TRACK ROLLER FOR TRACK-TYPE TRACTOR

In bearing roller assemblies the rims which ride on the endless tracks of a track type machine are subjected to extremely heavy pounding in operation and are subjected to becoming enlarged and flaring out in a manner known to the trade as bellmouthing. This deformation of the rims in itself is a disadvantage, but an accompanying and more serious disadvantage results from the fact that the rims are press fitted to a hub which in turn contains bearing sleeves which embrace and rotate on a dead shaft or track roller shaft. It is found that press fitting of the rims onto the hub causes slight inward compression or distortion of the hub and the bearing sleeves within it. Consequently enlargement of the rims relieves the compressive force on the hub and permits it to expand toward its normal diameter and configuration. This results in separation either between the hub and bearing sleeves or between the bearing sleeves and dead shaft so that a loose bearing fit is produced with resulting destruction of the bearing sleeves.

The present invention overcomes the aforementioned disadvantages by assembling the rims on the hub with an unusually loose fit in the area where bellmouthing occurs thus avoiding destruction of the hub in this area and consequent enlarging of the hub upon bellmouthing of the rims.

A more complete understanding of the invention will be had upon reading the following specification wherein the invention is described in greater detail by reference to the accompanying drawing. The drawing is a central cross-sectional view through a track roller assembly embodying the present invention.

A pair of rims 10 are shown in the drawing as fitted on a hub 12 which contains bearing sleeves 14. These sleeves rotate about the track roller shaft 16 which is shown as having a group of reservoirs 18 supplied with lubricant by means not shown and which form no part of the present invention. Conventional end caps shown at 20 and seals at 22 serve to retain lubricant in the area of the bearing surfaces.

It has been general practice to fit the rims onto the hub 12 with a 0.010 inch press fit and to locate them by a central band of material 24 providing locating shoulders 28 to properly orient the rims longitudinally of the hub while they are secured in place by a central connecting weld 30. The press fit caused compression of the hub and bearing sleeves and placed them under stress. Subsequent bellmouthing of the rims therefore created space between the rims and hub into which the hub could expand destroying the desirable fit between the hub and bearing sleeves, as well as between the bearing sleeves and shaft.

According to the present invention both ends of the hub are preferably reduced in size in areas which are substantially coincident with the track engaging portions of the rims to produce a loose stress free fit of 0.002 inch to 0.005 inch. Narrow bands subject to press fit remain between the inner margin of the reduced areas and the shoulders 28 and these bands are preferably just sufficiently wide to firmly retain the rims in place during assembly and welding. The bands are maintained narrow by slight undercuts close to the shoulders 28, as shown at 34, and by spacing the shoulders apart a distance greater than was previously employed. This greater spacing of the shoulders 28 has the further advantage that they are removed from the burning or cutting area upon disassembly of the roller when the weld 30 is removed. This preserves the shoulders and their function when new rims are assembled into place.

With the relieved areas which are illustrated at 36 where their proportion is exaggerated the hub is not deformed inwardly upon assembly and not subject to stress in the area where bellmouthing of the rims occurs. Consequently, as the rims expand the resulting expansion of the hub and bearing sleeves no longer occurs and the bearing life is lengthened.

We claim:

1. In a track roller which includes a hub having inner bearing means which are mounted for rotation upon a shaft and rim members which are press fitted on said hub and which have track engaging areas which surround the axially outer ends of said hub, the improvement which comprises relieved areas located between said hub and rim members disposed axially intermediate the ends of said hub to provide a loose stress-free fit between said hub and rim members throughout substantially the entire axial length of said hub except for those portions coincident with said press fit.

2. The improvement of claim 1 in which the rim members abut axially spaced shoulders disposed generally centrally on said hub and are welded together at a point axially intermediate said shoulders, and in which said rim members are press fitted on said hub axially between said shoulders and said hub ends and said relieved areas are axially intermediate said hub ends and press fit areas.

3. The improvement of claim 2 in which said shoulders are axially spaced apart and remote from said weld point.

4. The improvement of claim 2 in which the press fit is confined to narrow bands located axially between said shoulders and relieved areas.